United States Patent
Jun et al.

(10) Patent No.: US 9,488,134 B2
(45) Date of Patent: Nov. 8, 2016

(54) ENGINE SYSTEM HAVING TURBO CHARGER

(71) Applicant: Hyundai Motor Company, Seoul (KR)

(72) Inventors: Jong Man Jun, Hwaseong-si (KR); Hyoung Hyoun Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 102 days.

(21) Appl. No.: 14/296,223

(22) Filed: Jun. 4, 2014

(65) Prior Publication Data

US 2015/0167594 A1     Jun. 18, 2015

(30) Foreign Application Priority Data

Dec. 17, 2013  (KR) ........................ 10-2013-0157589

(51) Int. Cl.
*F02M 26/20*   (2016.01)
*F02M 26/28*   (2016.01)
(Continued)

(52) U.S. Cl.
CPC ...... *F02M 25/0737* (2013.01); *F02B 29/0462* (2013.01); *F02M 26/20* (2016.02); *F02M 26/28* (2016.02); *F02M 26/32* (2016.02); *F02M 35/10222* (2013.01); *F02B 29/0443* (2013.01); *F02M 26/05* (2016.02); *F02M 26/30* (2016.02); *F02M 35/112* (2013.01); *Y02T 10/146* (2013.01)

(58) Field of Classification Search
CPC ..................... F02M 25/0735; F02M 25/0723; F02M 35/10209; F02M 35/10222
USPC ........................................................ 60/605.2
See application file for complete search history.

(56) References Cited

U.S. PATENT DOCUMENTS

| 5,209,191 A | * | 5/1993 | Kopec | .............. F02M 35/10078 |
| | | | | 123/184.45 |
| 5,546,908 A | * | 8/1996 | Stokes | ..................... F02D 15/04 |
| | | | | 123/480 |
| 5,957,116 A | * | 9/1999 | Haegele | ............. F02M 25/0722 |
| | | | | 123/568.12 |

(Continued)

FOREIGN PATENT DOCUMENTS

| DE | 102004023540 A1 | * | 12/2005 | ............. F02B 47/08 |
| FR | WO 2012062715 A1 | * | 5/2012 | .......... F02B 29/0475 |

(Continued)

OTHER PUBLICATIONS

JP 2005325766 A English Translation.*

*Primary Examiner* — Thomas Denion
*Assistant Examiner* — Jessica Kebea
(74) *Attorney, Agent, or Firm* — Morgan, Lewis & Bockius LLP (57) ABSTRACT

An engine system having a turbocharger, in which an intake manifold is integrally formed, may include an intercooler that cools intake air supplied from the turbocharger, an EGR cooler that cools EGR gas supplied from an exhaust manifold, the intake manifold in which the intake air and the EGR gas supplied from the intercooler and the EGR cooler are mixed and that supplies a combustion chamber with the mixed gas, and a distribution unit that is mounted in the intake manifold and includes distribution pipes. One or each of the distribution pipes may receive the EGR gas from a connection hole through which the EGR gas is supplied and exhaust the EGR gas through an outlet towards an intake port.

4 Claims, 6 Drawing Sheets

(51) Int. Cl.
*F02M 26/30* (2016.01)
*F02M 35/10* (2006.01)
*F02B 29/04* (2006.01)
*F02M 25/07* (2006.01)
*F02M 35/112* (2006.01)

(56) References Cited

U.S. PATENT DOCUMENTS

| | | | |
|---|---|---|---|
| 6,116,026 A | 9/2000 | Freese | |
| 6,138,649 A * | 10/2000 | Khair | F01N 3/031 123/559.2 |
| 6,334,437 B1 * | 1/2002 | Jessberger | F02M 25/0703 123/568.12 |
| 6,752,133 B2 * | 6/2004 | Arnell | F02F 1/42 123/568.12 |
| 6,966,310 B2 * | 11/2005 | Moren | F01M 13/022 123/184.54 |
| 7,100,559 B2 * | 9/2006 | Uchiyama | F02M 25/06 123/184.38 |
| 7,234,453 B2 * | 6/2007 | Gallino | F01P 3/20 123/41.31 |
| 8,499,748 B2 * | 8/2013 | Braic | F02M 25/0703 123/568.17 |
| 8,677,982 B2 * | 3/2014 | Marimbordes | F02B 29/0475 123/563 |
| 8,925,529 B2 * | 1/2015 | van Hal | F02M 25/0722 123/568.17 |
| 2007/0199320 A1 * | 8/2007 | Yager | F02B 29/0412 60/599 |
| 2013/0081601 A1 * | 4/2013 | Martins | F02M 25/0722 123/568.12 |
| 2013/0291842 A1 * | 11/2013 | Martins | F02B 29/0475 123/568.17 |
| 2013/0298884 A1 * | 11/2013 | Odillard | F02M 25/0721 123/568.17 |

FOREIGN PATENT DOCUMENTS

| | | | |
|---|---|---|---|
| JP | 9-317579 A | | 12/1997 |
| JP | 2005325766 A | * | 11/2005 |
| JP | 3861968 B2 | | 10/2006 |
| JP | 2007211698 A | * | 8/2007 |
| JP | 2011-190744 A | | 9/2011 |
| KR | 1020120093024 A | | 8/2012 |

* cited by examiner

ENGINE SYSTEM HAVING TURBO CHARGER

CROSS-REFERENCE TO RELATED APPLICATION

The present application claims priority of Korean Patent Application Number 10-2013-0157589 filed on Dec. 17, 2013, the entire contents of which application are incorporated herein for all purposes by this reference.

BACKGROUND OF INVENTION

1. Field of Invention

The present invention is related to an engine having a turbocharger that improves an output, a combustion efficiency, and exhaust gas quality during a low speed area by using a turbocharger.

2. Description of Related Art

Generally, a diesel engine has been known that its fuel consumption is low and the efficiency thereof is good, as compared to a gasoline engine. Its efficiency is about 40%, and this can be realized by a high compression ratio.

Recently, a turbocharger and an intercooler are mounted on the engine so as to achieve further larger amount of output. Like this, the engine having the turbocharger sucks outside air or exhaust gas to compress this, and the compressed air is supplied to combustion room of the engine side.

However, the air that is rapidly compressed absorbs heat that is generate during the compression process or heat of the turbocharger so that the density thereof is decreased, and resultantly charging efficiency inside an engine combustion chamber is deteriorated.

Thus, an intercooler is used to cool the compressed air so that the density of compressed air is increased, and resultantly large amount of air is supplied to an engine combustion chamber so that high output can be offered.

Meanwhile, an water cooled intercooler method in which an intake manifold is integrally formed has been used to realize compact engine layout and minimize flowing resistance by reducing flow passage, but high pressure exhaust gas recirculation (HP-EGR) pipe is integrally casted with an intake manifold, and therefore a distribution efficiency of HP-EGR can be deteriorated.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide an engine system having a turbocharger having advantages of improving cooling efficiency of an intercooler and an EGR cooler and improving distribution characteristic that EGR gas is distributed in an intake manifold by enhancing a structure that is engaged with an intake manifold.

An engine system having a turbocharger according to various aspect of the present invention may include an intercooler that cools intake air supplied from the turbocharger, an EGR cooler that cools EGR gas supplied from an exhaust manifold, an intake manifold in which the intake air and the EGR gas supplied from the intercooler and the EGR cooler are mixed and that supplies a combustion chamber with the mixed gas, and a distribution unit that is mounted in the intake manifold and includes distribution pipes, wherein one or each of the distribution pipes receives the EGR gas from a connection hole through which the EGR gas is supplied and exhausts the EGR gas through an outlet towards an intake port.

The distribution pipes may be fixed on a fixation bracket that is fixed on an inner side surface of the intake manifold. The outlet may be formed at a side surface of the one or each of the distribution pipes such that the EGR gas is exhausted towards the intake port. The one or each of the distribution pipes may have a curved line shape such that the EGR gas is exhausted towards the intake port.

An EGR passage that receives the EGR gas may be integrally formed in the intake manifold and a coolant passage may be integrally formed at an outside of the EGR passage. A low temperature coolant that passes the coolant passage formed at an outside of the EGR passage may pass the intercooler. The intercooler may be directly connected to the intake manifold.

According to the present invention, an intercooler is integrally formed with an intake manifold, an EGR cooler is integrally formed with the intake manifold, and the intercooler and the EGR cooler are operated through low temperature coolant to improve overall cooling efficiency.

Also, a distribution unit is mounted in an intake manifold to inject EGR gas toward an intake port such that mixing efficiency of EGR gas and intake air is improved and engine efficiency is improved.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
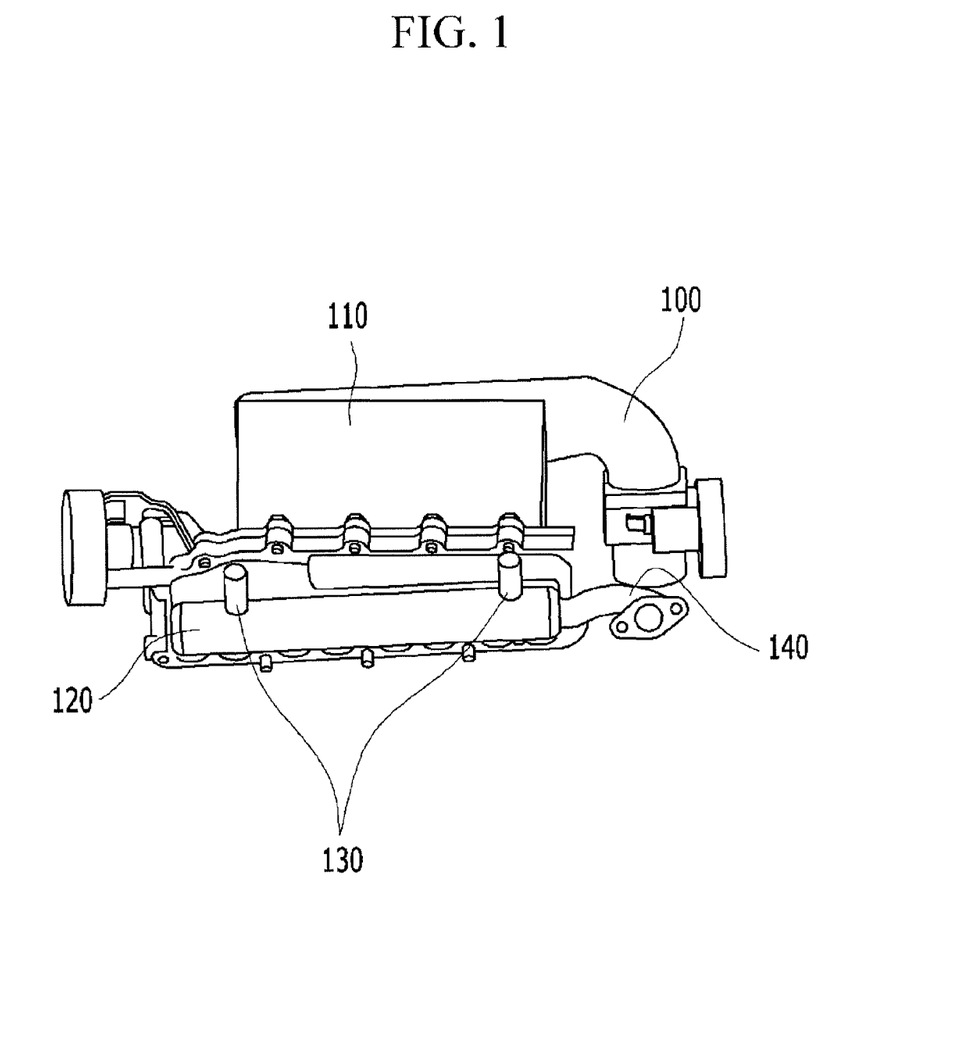
FIG. 1 is a partial perspective view of an exemplary engine system having a turbocharger according to the present invention.

FIG. 1 is a partial perspective view of an engine system having a turbocharger according to various embodiments of the present invention. Referring to FIG. 1, an engine system includes an intake line 100, an intercooler 110, an intake manifold 120, an EGR line 140, and a coolant inlet/outlet 130.

The intercooler 110 is disposed on the intake line 100, and the intercooler 110 is directly combined with the intake manifold 120. The EGR line 140 is connected to one side of the intake manifold 120 and coolant inlet/outlet 130 is formed on the intake manifold 120, through which a low temperature coolant is supplied and exhausted.

A compressed air is supplied from a turbocharger, the compressed air is transmitted to a combustion chamber through the intake line 100, the intercooler 110, and the intake manifold 120.

And, exhaust gas that is combusted in the combustion chamber is exhausted through an exhaust manifold, and a part of the exhaust gas is recirculated to the intake manifold 120 through the EGR line 140.

A low temperature coolant flowing the coolant inlet/outlet 130 of the intake manifold 120 cools EGR gas flowing the EGR line 140, and the cooled EGR gas is mixed with intake air in the intake manifold 120 to be supplied to a cylinder through an intake port.

Figure 2:
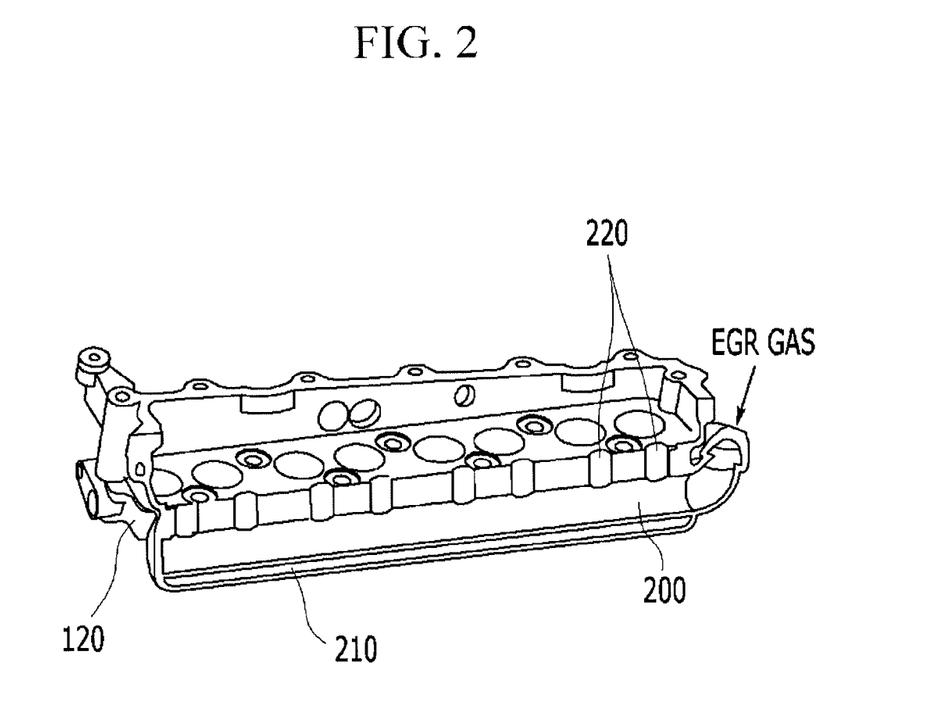
FIG. 2 is a partial sectional perspective view of an intake manifold of an exemplary engine system having a turbocharger according to the present invention.

FIG. 2 is a partial sectional perspective view of an intake manifold of an engine system having a turbocharger according to various embodiments of the present invention. Referring to FIG. 2, an EGR gas passage 200 through which EGR gas is flow is formed the intake manifold 120 along a length direction thereof, and the EGR gas passage 200 is connected to the EGR line 140 to receive EGR gas from an exhaust manifold.

A low temperature coolant passage 210 is formed at an outside of the EGR gas passage 200, and a low temperature coolant circulates through the low temperature coolant passage 210. As described above, the low temperature coolant passage 210 is connected to the coolant inlet/outlet 130 and receives and exhausts low temperature coolant.

In some embodiments of the present invention, the EGR gas passage 200 is integrally or monolithically formed with the intake manifold 120, and a low temperature coolant passage 210 is formed along the EGR gas passage 200 such that cooling efficiency of EGR gas is improved and separate EGR cooler is not necessary and can be eliminated.

Also, an EGR connection hole 220 is formed from the EGR gas passage 200 to an inner side of the intake manifold 120 corresponding to an intake port of each cylinder. the number and the size of the EGR connection hole 20 can be set by considering the characteristics of exhaust gas of an engine corresponding to each cylinder. Further, in some embodiments of the present invention, low temperature coolant sequentially circulates the intercooler 110 cooling compress air and the low temperature coolant passage 210 cooling EGR gas to improve overall cooling efficiency.

Figure 3:
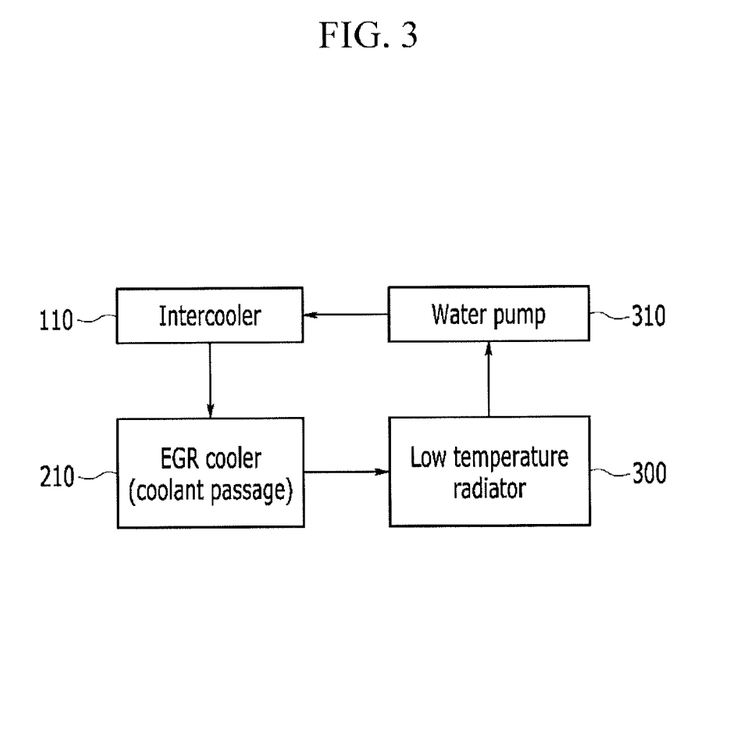
FIG. 3 is a flowchart showing a flow of a low temperature coolant in an exemplary engine system having a turbocharger according to the present invention.

FIG. 3 is a flowchart showing a flow of a low temperature coolant in an engine system having a turbocharger according to various embodiments of the present invention. Referring to FIG. 3, low temperature coolant circulates a separate coolant line contrary to engine coolant circulating an engine block, more specifically the low temperature coolant circulates a water pump 310, the intercooler 110, the low temperature coolant passage 210 functioning as an EGR cooler, and a low temperature radiator 300.

In some embodiments of the present invention, the water pump 310 is a motorized type and is operated depending on a driving condition of an engine to improve cooling efficiency and effectively control the performance of the engine.

Figure 4:
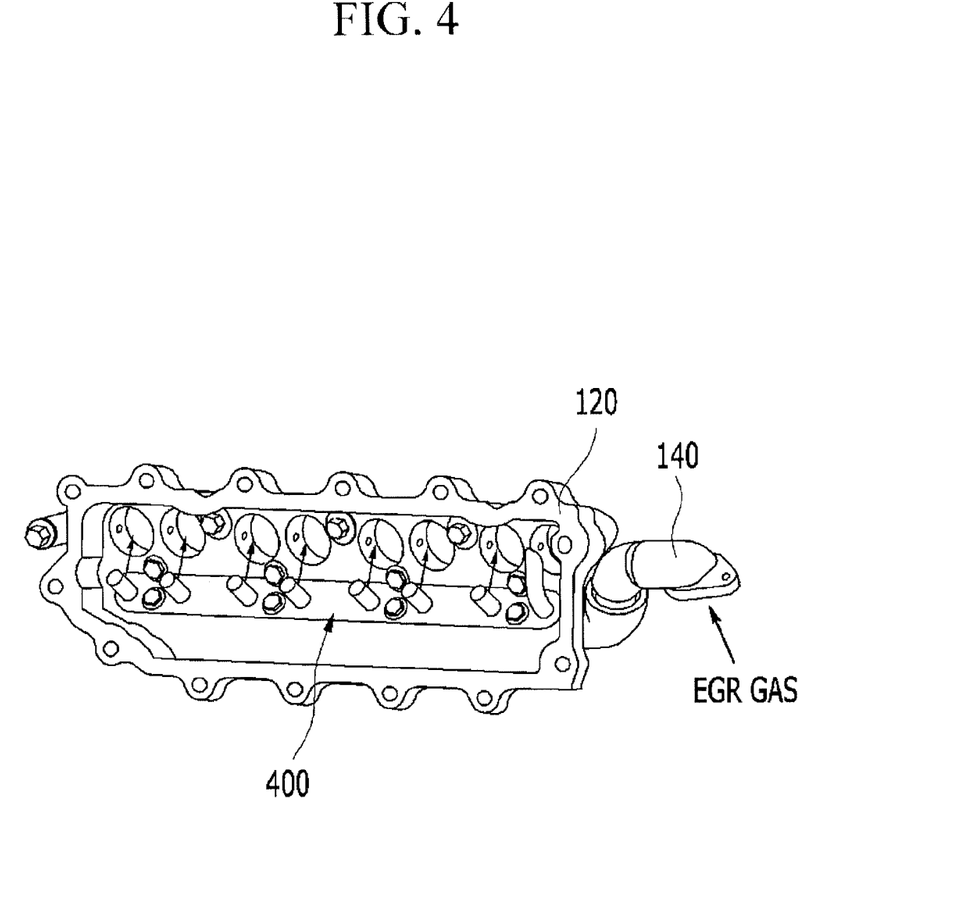
FIG. 4 is a partial exploded perspective view of an intake manifold in an exemplary engine system having a turbocharger according to the present invention.

FIG. 4 is a partial exploded perspective view of an intake manifold in an engine system having a turbocharger according to various embodiments of the present invention. Referring to FIG. 4, the EGR gas passage 200 of the intake manifold 120 receives EGR gas from the EGR line 140. And, EGR gas that is supplied through the EGR gas passage 200 passes the connection hole 220, the EGR gas that passes the connection hole 220 is injected from the EGR gas distribution unit 400 toward an intake port.

Figure 5:
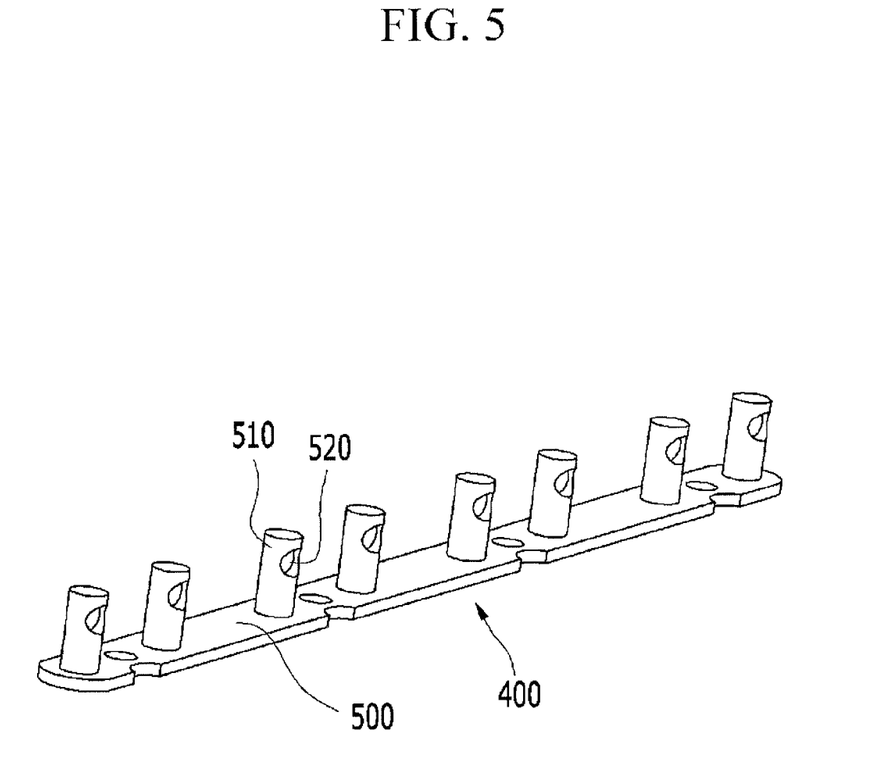
FIG. 5 is a perspective view of a distribution unit in an exemplary engine system having a turbocharger according to the present invention.

FIG. 5 is a perspective view of a distribution unit in an engine system having a turbocharger according to various embodiments of the present invention. Referring to FIG. 5, the distribution unit 400 includes a fixation bracket 500 that is fixed on an inner surface of one side of the intake manifold 120 and a distribution pipe or a plurality of distribution pipes 510 that is connected to the fixation bracket 500 and receives EGR gas from the connection hole 220 to inject the EGR gas.

The fixation bracket 500 and the distribution pipe 510 is integrally formed, and the outlet 520 is formed at a side surface of an end portion of the distribution pipe 510 to inject EGR gas. The EGR gas that is exhausted through the outlet 520 is injected toward an intake port side.

Figure 6:
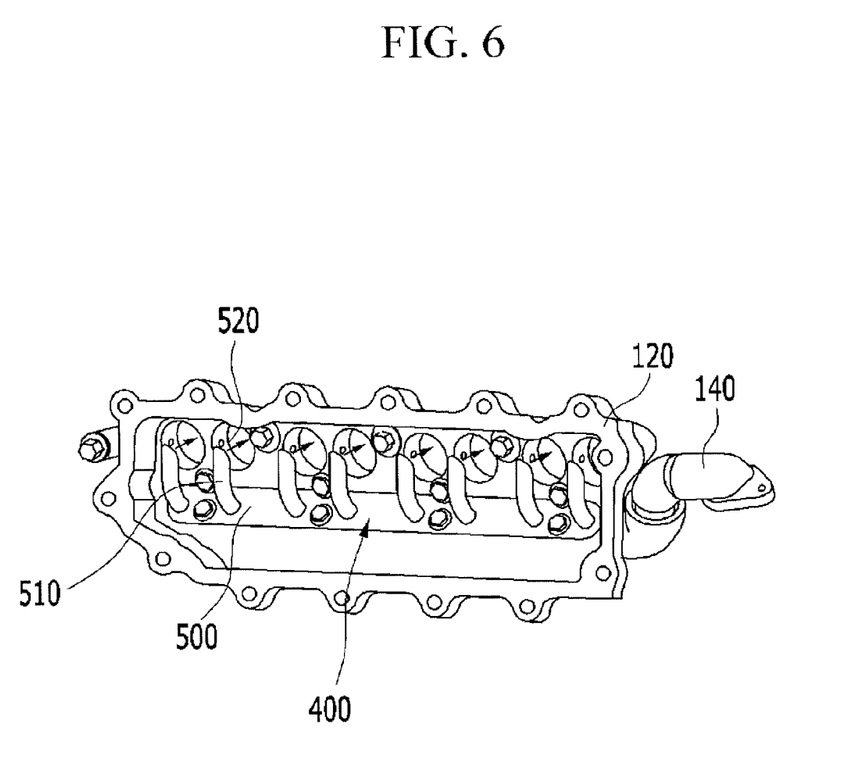
FIG. 6 is a partial exploded perspective view of an intake manifold in another exemplary engine system having a turbocharger according to the present invention.

FIG. 6 is a partial exploded perspective view of an intake manifold in an engine system having a turbocharger according to various other embodiments of the present invention. Referring to FIG. 6, EGR gas that is supplied through the EGR gas passage 200 passes the connection hole 220, the EGR gas that passes the connection hole 220 is injected toward an intake port from the EGR gas distribution unit 400 that is mounted on an inner side of the intake manifold 120.

The distribution unit 400 includes a fixation bracket 500 that is fixed on an inner surface of one side of the intake manifold 120 and a distribution pipe or a plurality of distribution pipes 510 that is connected to the fixation bracket 500 and receives EGR gas from the connection hole 220.

The fixation bracket 500 and the distribution pipe or pipes 510 are integrally or monolithically formed, an outlet 520 is formed at one end of the distribution pipe 510, and the distribution pipe 510 has a curved line shape such that the outlet 520 faces an intake port. Accordingly, EGR gas that is exhausted through the outlet 520 that is formed at one end of the distribution pipe 510 is injected toward an intake port.

For convenience in explanation and accurate definition in the appended claims, the terms "inner" or "outer", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine system having a turbocharger in which an intake manifold is integrally formed, the engine system comprising:
    an intercooler cooling intake air supplied from the turbocharger;
    an EGR cooler cooling EGR gas supplied from an exhaust manifold;
    the intake manifold in which the intake air and the EGR gas supplied from the intercooler and the EGR cooler are mixed and that supplies a combustion chamber with the mixed gas; and
    a distribution unit mounted in the intake manifold and including distribution pipes,
    wherein one or each of the distribution pipes receives the EGR gas from a connection hole through which the EGR gas is supplied and exhausts the EGR gas through an outlet towards an intake port,
    wherein an EGR gas passage receiving the EGR gas is integrally formed in the intake manifold and the EGR cooler comprises a coolant passage integrally formed at an outside of the EGR gas passage,
    wherein a low temperature coolant passing through the coolant passage formed at the outside of the EGR gas passage passes through the intercooler, and
    wherein the intercooler is directly connected to the intake manifold.

2. The engine system of claim 1, wherein the distribution pipes are fixed on a fixation bracket fixed on an inner side surface of the intake manifold.

3. The engine system of claim 1, wherein the outlet is formed at a side surface of the one or each of the distribution pipes such that the EGR gas is exhausted towards the intake port.

4. The engine system of claim 1, wherein the one or each of the distribution pipes has a curved line shape such that the EGR gas is exhausted towards the intake port.

* * * * *